United States Patent
Kogami et al.

(10) Patent No.: US 12,476,306 B2
(45) Date of Patent: Nov. 18, 2025

(54) POWER SUPPLY DEVICE AND ELECTRIC VEHICLE

(71) Applicant: SANYO Electric Co., Ltd., Osaka (JP)

(72) Inventors: Nao Kogami, Hyogo (JP); Kazuhiro Harazuka, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 722 days.

(21) Appl. No.: 17/439,225

(22) PCT Filed: Dec. 20, 2019

(86) PCT No.: PCT/JP2019/050063
§ 371 (c)(1),
(2) Date: Sep. 14, 2021

(87) PCT Pub. No.: WO2020/194938
PCT Pub. Date: Oct. 1, 2020

(65) Prior Publication Data
US 2022/0166086 A1    May 26, 2022

(30) Foreign Application Priority Data
Mar. 27, 2019   (JP) .................................. 2019-060105

(51) Int. Cl.
*H01M 10/658* (2014.01)
*H01M 10/625* (2014.01)
(Continued)

(52) U.S. Cl.
CPC ....... *H01M 10/658* (2015.04); *H01M 10/625* (2015.04); *H01M 10/647* (2015.04);
(Continued)

(58) Field of Classification Search
CPC ............. H01M 10/658; H01M 10/625; H01M 10/647; H01M 50/209; H01M 50/264;
(Continued)

(56) References Cited

U.S. PATENT DOCUMENTS

2008/0280198 A1    11/2008 Kumar et al.
2013/0108908 A1     5/2013 Omura et al.
(Continued)

FOREIGN PATENT DOCUMENTS

| CN | 206059484 U | 3/2017 |
| JP | 2018-204708 | 12/2018 |

(Continued)

OTHER PUBLICATIONS

Machine translation of JP 2018204708 (Year: 2018).*
(Continued)

*Primary Examiner* — Eugenia Wang
(74) *Attorney, Agent, or Firm* — WHDA, LLP (57) ABSTRACT

A power supply device has end plates disposed at both ends of a battery block in which a plurality of battery cells and separator are stacked and connected by a binding bar. Separator includes heat insulating sheet including a fiber sheet and silica aerogel, and rubber-like elastic sheets stacked on a surface of heat insulating sheet. Furthermore, separator is provided with stacked region where rubber-like elastic sheets are stacked and non-stacked region where rubber-like elastic sheets are not stacked.

20 Claims, 8 Drawing Sheets (51) Int. Cl.
  *H01M 10/647* (2014.01)
  *H01M 50/209* (2021.01)
  *H01M 50/264* (2021.01)
  *H01M 50/291* (2021.01)
  *H01M 50/293* (2021.01)

(52) U.S. Cl.
  CPC ....... *H01M 50/209* (2021.01); *H01M 50/264* (2021.01); *H01M 50/291* (2021.01); *H01M 50/293* (2021.01); *H01M 2220/20* (2013.01)

(58) Field of Classification Search
  CPC ............. H01M 50/291; H01M 50/293; H01M 50/409; H01M 2220/20; Y02E 60/10
  See application file for complete search history.

(56) References Cited

U.S. PATENT DOCUMENTS

| | | | | |
|---|---|---|---|---|
| 2014/0193685 A1* | 7/2014 | Lim | ................... | H01M 50/209 429/99 |
| 2014/0302378 A1* | 10/2014 | Tsuruta | ............... | H01M 50/209 429/186 |
| 2014/0335398 A1 | 11/2014 | Partin et al. | | |
| 2019/0181488 A1* | 6/2019 | Ejima | ................. | H01M 50/209 |
| 2019/0190098 A1 | 6/2019 | Abe | | |
| 2020/0058912 A1 | 2/2020 | Kuramitsu et al. | | |
| 2020/0365853 A1* | 11/2020 | Hashimoto | ......... | H01M 10/625 |

FOREIGN PATENT DOCUMENTS

| | | | |
|---|---|---|---|
| WO | 2018/061894 A1 | 4/2018 | |
| WO | 2018/110055 | 6/2018 | |
| WO | WO-2018207608 A1 * | 11/2018 | .............. B60L 50/60 |

OTHER PUBLICATIONS

English Translation of Chinese Search Report dated Jan. 20, 2023 for the related Chinese Patent Application No. 201980093845.0. (3 pages).
The Extended European Search Report dated Apr. 19, 2022, issued in counterpart EP Application No. 19920802.6. (10 pages).
International Search Report of PCT application No. PCT/JP2019/050063 dated Jan. 28, 2020.
Office Action dated Nov. 6, 2023, issued in counterpart IN Patent Application No. 202147046849. (6 pages).

* cited by examiner

POWER SUPPLY DEVICE AND ELECTRIC VEHICLE

CROSS-REFERENCE TO RELATED APPLICATIONS

This application is a U.S. national stage application of the PCT International Application No. PCT/JP2019/050063 filed on Dec. 20, 2019, which claims the benefit of foreign priority of Japanese patent application No. 2019-060105 filed on Mar. 27, 2019, the contents all of which are incorporated herein by reference.

TECHNICAL FIELD

The present invention relates to a power supply device in which a large number of battery cells are stacked, and an electric vehicle on which this power supply device is mounted.

BACKGROUND ART

The power supply device in which a large number of battery cells are stacked is suitable as a power supply that is mounted on an electric vehicle and supplies electric power to a motor that drives the vehicle, a power supply that is charged with natural energy such as a solar cell or midnight electric power, and a backup power supply for power failure. In the power supply device having this structure, a separator is sandwiched between the stacked battery cells. The separator insulates heat conduction between the battery cells and suppresses induction of thermal runaway of the battery cells. The thermal runaway of the battery cell occurs due to an internal short circuit caused by an internal short circuit between the positive electrode and the negative electrode, erroneous handling, or the like. Since a large amount of heat is generated when thermal runaway of the battery cell occurs, thermal runaway is induced in adjacent battery cells if the heat insulating property of the separator is not sufficient. When the thermal runaway of the battery cell is induced, the entire power supply device emits an extremely large amount of thermal energy, which impairs safety as a device. In order to prevent this adverse effect, a separator having a thermal insulating property using silica aerogel has been developed. This separator is obtained by filling a fiber gap of a fiber sheet with silica aerogel having an extremely low thermal conductivity of 0.02 W/m K, and achieves excellent thermal insulating properties, but has a disadvantage that the thermal insulating properties are deteriorated when the silica aerogel is broken by external pressure.

In the power supply device in which the battery cells are stacked, the battery cells expand in a charged/discharged state, and the separator is pressed with a strong pressure. This state causes destruction of the silica aerogel and deterioration of the thermal insulating properties. In a power supply device in which a large number of battery cells are stacked with a separator interposed therebetween, the stacked battery cells are fixed in a pressurized state in order to block positional displacement due to expansion of the battery cells. In order to achieve this, in the power supply device, a pair of end plates are disposed on both end surfaces of a battery block in which a large number of battery cells are stacked, and the pair of end plates are coupled by a binding bar. The binding bar and the end plates hold the battery cells in a pressurized state with considerably strong pressure to prevent malfunction due to relative movement and vibration of the battery cells. For this reason, for example, in a power supply device in which battery cells having a stack surface area of about 100 square centimeters are stacked, the end plate is pressed with a strong force of several tons and fixed with a binding bar. A separator having a structure in which the separator is sandwiched between battery cells in a pressurized state to suppress deterioration of heat insulating properties has been developed (See PTL 1).

CITATION LIST

Patent Literature

PTL 1: Unexamined Japanese Patent Publication No. 2018-204708

SUMMARY OF THE INVENTION

Technical Problem

The separator of PTL 1 has a composite layer containing a fiber sheet and silica aerogel, and the fiber sheet is folded back and stacked to form a multilayer structure, which is pressurized to prevent destruction of the silica aerogel. Since the separator having this structure is folded and stacked, it has a disadvantage that the entire separator becomes thick, and also has a disadvantage that the internal structure becomes uneven between the folded portion and the stacked portion of the fiber sheet, and it is difficult to equalize the pressure difference at the pressing surface with the battery cell. When the separator becomes thicker, the battery block in which the battery cells are stacked becomes longer and larger, and the separator that cannot uniformly pressurize and support the pressing surface of the battery cells adversely affects the electrodes of the battery cells. Furthermore, the separator including the composite layer of a fiber sheet and silica aerogel cannot absorb expansion of the battery cells. Hence, when the battery cells expand, the pressure of the battery cells rapidly rises, and an extremely strong force acts on the end plate and the binding bar. For this reason, the end plate and the binding bar are required to have an extremely strong material and structure, and thus the power supply device becomes heavy in weight, large in size, and high in material cost.

The present invention has been developed for the purpose of solving the above-mentioned disadvantages, and an object of the present invention is to provide a technology that can suppress deterioration of heat insulating properties of a separator due to expansion of a battery cell by absorbing expansion of the battery cell by the separator, and further reduce application of an excessive force to an end plate or a binding bar due to expansion of the battery cell.

A power supply device according to an aspect of the present invention includes battery block 10 including a plurality of battery cells 1 stacked in a thickness with separator 2 interposed therebetween, a pair of end plates 3 disposed on both end surfaces of battery block 10, and binding bar 4 coupled to the pair of end plates 3 and fixing battery block 10 in a pressurized state via end plates 3. Separator 2 includes heat insulating sheet 5 made of a fiber sheet and silica aerogel, and rubber-like elastic sheets 6 stacked on the surface of heat insulating sheet 5. Furthermore, separator 2 is provided with stacked region 2A in which rubber-like elastic sheets 6 are stacked and non-stacked region 2B in which rubber-like elastic sheets 6 are not stacked.

An electric vehicle according to an aspect of the present invention includes power supply device 100, traveling motor 93 to which electric power is supplied from power supply device 100, vehicle body 91 on which power supply device 100 and motor 93 are mounted, and wheels 97 driven by motor 93 to cause vehicle body 91 to travel.

The power supply device described above is characterized in that expansion of the battery cell is absorbed by the separator to prevent deterioration of heat insulating properties of the separator due to expansion of the battery cell, and it is possible to reduce the influence of excessive stress applied to the end plate and the binding bar due to expansion of the battery cell.

DESCRIPTION OF EMBODIMENTS

The present invention will be described in detail below with reference to the drawings. In the following description, terms (e.g., "upper", "lower", and other terms including those terms) indicating specific directions and positions are used where necessary. However, use of these terms is for facilitation of understanding of the invention with reference to the drawings, and does not limit the technical scope of the present invention by the meanings of these terms. Parts denoted by the same reference numerals in a plurality of drawings indicate the same or equivalent parts or members.

Furthermore, the following exemplary embodiments illustrate specific examples of the technical idea of the present invention, and do not limit the present invention to the following. In addition, unless otherwise specified, dimensions, materials, shapes, relative arrangements, and the like of the components described below are not intended to limit the scope of the present invention thereto, but are intended to be illustrative. The contents described in one embodiment and example are applicable also to other embodiments and examples. In addition, sizes, positional relationships, and the like of members illustrated in the drawings may be exaggerated for clarity of description.

A power supply device according to a first exemplary embodiment of the present invention includes: a battery block in which a plurality of battery cells are stacked in a thickness with a separator interposed therebetween; a pair of end plates disposed on both end surfaces of the battery block; and a binding bar coupled to the pair of end plates and fixing the battery block in a pressurized state via the end plates. In the separator, rubber-like elastic sheets are stacked on the surface of a heat insulating sheet including a fiber sheet and silica aerogel. Furthermore, without the rubber-like elastic sheets stacked on the entire surface of the heat insulating sheet, the separator is partitioned into a stacked region where the rubber-like elastic sheets are stacked and a non-stacked region where the rubber-like elastic sheets are not stacked.

In the power supply device described above, since the separator stacked between the battery cells is provided with the rubber-like elastic sheet that thinly deforms when pressurized on the surface of the heat insulating sheet, the separator becomes thin when the battery cells expand to pressurize the rubber-like elastic sheets. Therefore, it is possible to suppress an increase in surface pressure between the battery cells and the separator due to expansion of the battery cells. The heat insulating sheet composed of a fiber sheet and silica aerogel exhibits excellent heat insulating properties due to extremely low thermal conductivity of silica aerogel of fine inorganic particles, but since silica aerogel of an inorganic fluid is filled in fiber gaps, the thickness is not deformed even when pressurized. When this heat insulating sheet is pressurized by the strong pressure of the battery cells and the compressive stress becomes strong, the silica aerogel of the inorganic particles is broken and the heat insulating properties deteriorate. Silica aerogel is fine particles composed of a skeleton of silicon dioxide ($SiO_2$) and 90% to 98% of air, and when strong compressive stress acts, the silica aerogel is broken and the thermal conductivity is lowered. Since the rubber-like elastic sheets stacked on the surface of the heat insulating sheet thinly deform by the pressure of the battery cells, the compressive stress of the silica aerogel, which is increased by expansion of the battery cell, is reduced. For this reason, by suppressing the expanding battery cells from pressurizing the heat insulating sheet to break the silica aerogel, the excellent heat insulating properties of the heat insulating sheet are maintained. The separator that maintains excellent heat insulating properties even in a state where the battery cells expand keeps adjacent battery cells in an excellent heat insulating state for a long period of time, prevents thermal runaway of the battery cells from being induced next to each other, and ensures the safety of the power supply device for a long period of time.

Furthermore, in the power supply device described above, in a state where the battery cells expand, the rubber-like elastic sheets stacked on the heat insulating sheet thinly deform to reduce the internal stress of the heat insulating sheet, so that it is not necessary to have a special structure in which the heat insulating sheet itself is deformed by pressure. Therefore, it is possible to suppress deterioration of heat insulating properties due to breakage of silica aerogel while using a heat insulating sheet that is not crushed by pressure.

Furthermore, in addition to the above features, in the power supply device described above, since the rubber-like elastic sheets provided on the separator are thinned due to expansion of the battery cells, it is possible to suppress a rise in pressure due to expansion of the battery cells. Therefore, it is possible to reduce the maximum stress by suppressing an increase in stress of the end plate and the binding bar due to expansion of the battery cells. This is effective in reducing the thickness and weight of the end plate and the binding bar. Furthermore, in the power supply device described above, since the rubber-like elastic sheets thinly deform due to the expansion of the battery cells, it is possible to suppress the relative position from being displaced due to the expansion of the battery cells. The relative position displacement in adjacent battery cells causes damage to the bus bar of a metal plate fixed to the electrode terminal of the battery cell and the electrode terminal. The power supply device that can prevent relative position displacement of the battery cells in which rubber-like elastic sheets expand can prevent failure of a connection portion between the electrode terminal and the bus bar due to expansion of the battery cells.

Furthermore, in the power supply device described above, without the rubber-like elastic sheets stacked on the entire surface of the separator, the rubber-like elastic sheets are stacked only in the stacked region, and the rubber-like elastic sheets are not stacked in the non-stacked region. In this structure, since the rubber-like elastic sheets do not adhere to the entire surface of the battery cells, the battery cells expand to the non-stacked region, and the pressure rise between the battery cells and the separator is suppressed. In the battery block in which the battery cells are stacked, the sum of the pressing forces in both the stacked region and the non-stacked region acts on the end plate. However, in the power supply device that can reduce the pressure in the non-stacked region in a state where the battery cells expand, the maximum stress acting on the end plate and the bus bar can be reduced by lowering the pressing force by which the battery block presses the end plate. In addition, the entire pressing force with which the battery cells stress the separator is also reduced, and it is possible to suppress positional displacement of the battery cells due to an increase in the pressing force.

Furthermore, in the power supply device described above, by providing the separator with the non-stacked region, the maximum stress of the end plate and the binding bar at the time of expansion of the battery cells can be reduced, and moreover, the pressure change of the battery cells at the boundary part between the stacked region and the non-stacked region is mitigated. Preventing damage to the battery cells due to expansion of the battery cells is an extremely important characteristic because it ensures high safety in the power supply device. The separator provided with the stacked region and the non-stacked region has a step in thickness at the boundary part between the stacked region and the non-stacked region. The separator strongly pressurizes the surfaces of the battery cells in the stacked region, the pressure decreases in the non-stacked region, and the pressure rapidly changes at the boundary part between the stacked region and the non-stacked region. This state applies a mechanical load to the electrodes inside the battery. In the electrode of the battery, positive and negative electrodes are locally damaged by a local mechanical load, which causes an internal short circuit. The internal short circuit of the battery causes an excessive short-circuit current to flow, which causes thermal runaway. When the battery cells further undergo thermal runaway, excessive thermal energy is generated, which hinders safety.

Figure 5:
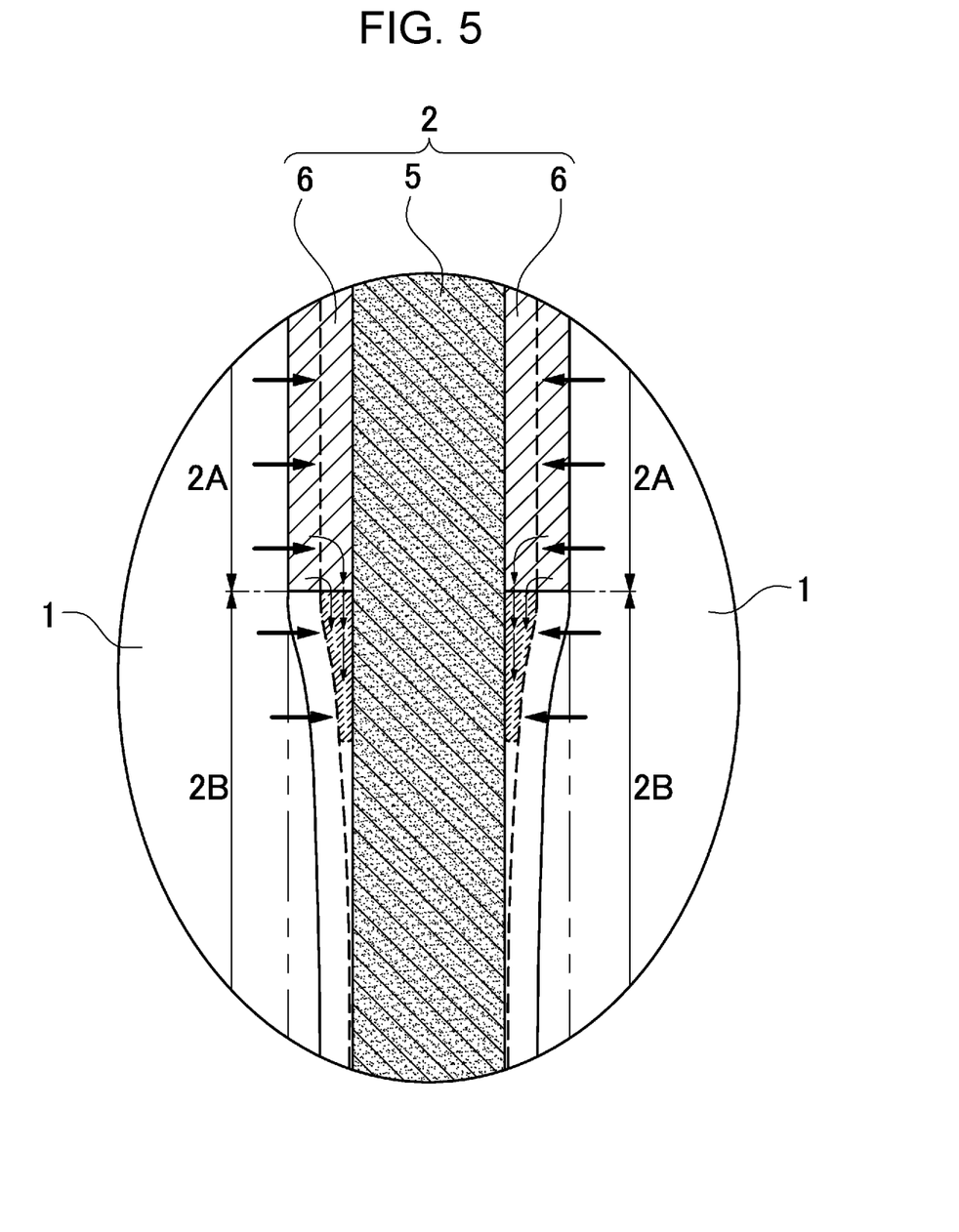
FIG. 5 is an enlarged cross-sectional view of a main part of the separator.

In the power supply device described above, as illustrated in the enlarged cross-sectional view of FIG. 5, when battery cells 1 expand and the pressure in stacked region 2A increases, rubber-like elastic sheets 6 stacked here are thinly compressed and move from stacked region 2A toward non-stacked region 2B. Since rubber-like elastic sheet 6 has incompressibility in which the volume hardly changes due to compression, when rubber-like elastic sheets 6 in stacked region 2A are thinly compressed, rubber-like elastic sheets 6 protrude from stacked region 2A and moves toward non-stacked region 2B. The rubber-like elastic sheets moving to the non-stacked region mitigates a change in pressure at the boundary part between the stacked region and the non-stacked region. The power supply device in which battery cells expand and a change in pressure on the surface of the battery cells can be mitigated at the boundary part between the stacked region and the non-stacked region achieves a feature that a mechanical load of the electrode of the battery cell is reduced to prevent damage of the electrode, and thermal runaway of the battery caused by the damage of the electrode can be prevented to significantly improve safety.

In the power supply device according to the second exemplary embodiment of the present invention, the battery cells are prismatic battery cells. In the separator, the outer peripheral portion of the heat insulating sheet is a stacked region, and the central portion of the heat insulating sheet is a non-stacked region. This power supply device can reduce the pressure of the battery cells in the non-stacked region by using a prismatic battery cell as a battery cell, and can reduce the battery cell pressurizing the separator and applying a mechanical load to the electrode at the boundary part between the outer peripheral portion and the inside. In addition, the non-stacked region is provided in the central portion of the prismatic battery cell, and the pressure in this portion is reduced, so that the stress acting on the end plate and the bus bar can be reduced.

In the power supply device according to the third exemplary embodiment of the present invention, rubber-like elastic sheets are stacked on both surfaces of a heat insulating sheet to absorb expansion of battery cells on both surfaces of a separator, and thin rubber-like elastic sheets are stacked on the surface of the heat insulating sheet to equalize pressures on both surfaces of the battery cell, thereby achieving high safety.

In the power supply device of the fourth exemplary embodiment of the present invention, the separator has a structure in which the rubber-like elastic sheet is stacked only on one surface of the heat insulating sheet. In this power supply device, expansion of battery cells stacked on both surfaces of the separator can be absorbed by the rubber-like elastic sheet stacked on one surface of the heat insulating sheet while reducing manufacturing cost by thinning the separator.

In the power supply device according to the fifth exemplary embodiment of the present invention, the rubber-like elastic sheet of the separator can be a non-foamed rubber-like elastic body or a closed-cell foam. Since this power supply device uses a non-foamed rubber-like elastic body or a closed-cell foam as a rubber-like elastic sheet, the power supply device is excellent in incompressibility in which the volume hardly changes when compressed. Therefore, the rubber-like elastic sheet is compressed at the time of expansion of the battery cells, efficiently moves from the stacked region to the non-stacked region, a pressure change between the stacked region and the non-stacked region can be more effectively mitigated, and thermal runaway caused by a mechanical load of the battery cell electrode can be prevented to further enhance the safety.

In the power supply device according to the sixth exemplary embodiment of the present invention, the rubber-like elastic sheet is a synthetic rubber sheet. Furthermore, in the power supply device according to the seventh embodiment of the present invention, the synthetic rubber is any of isoprene rubber, styrene butadiene rubber, butadiene rubber, chloroprene rubber, nitrile rubber, polyisobutylene rubber, ethylene propylene rubber, ethylene vinyl acetate copolymer rubber, chlorosulfonated polyethylene rubber, acrylic rubber, fluororubber, epichlorohydrin rubber, urethane rubber, silicone rubber, thermoplastic olefin rubber, ethylene propylene diene rubber, butyl rubber, and polyether rubber.

The ethylene vinyl acetate copolymer rubber of the rubber-like elastic sheet can have a high heat resistance temperature of 200° C., the acrylic rubber can have a high heat resistance temperature of 180° C., the fluororubber can have a high heat resistance temperature of 300° C., and the silicone rubber can have a high heat resistance temperature of 280° C.

In the power supply device according to the eighth exemplary embodiment of the present invention, the thickness of the rubber-like elastic sheet is from 0.2 mm to 2 mm inclusive. Furthermore, in the power supply device according to the ninth exemplary embodiment of the present invention, the heat insulating sheet is made thicker than the rubber-like elastic sheet. In this power supply device, the thick heat insulating sheet can improve the heat insulating property of the separator, and can effectively suppress the induction of thermal runaway of the battery cells.

In the power supply device according to the tenth exemplary embodiment of the present invention, the thickness of the heat insulating sheet is from 0.5 mm to 2 mm inclusive.

In the power supply device according to the eleventh exemplary embodiment of the present invention, each of all separators stacked between battery cells has rubber-like elastic sheets stacked on the surface of the heat insulating sheet. In the power supply device described above, since all the separators have the rubber-like elastic sheets stacked on the surface of the heat insulating sheet, the pressures of all the battery cells can be equalized.

First Exemplary Embodiment

Hereinafter, a more specific power supply device and an electric vehicle will be described in detail.

Figure 1:
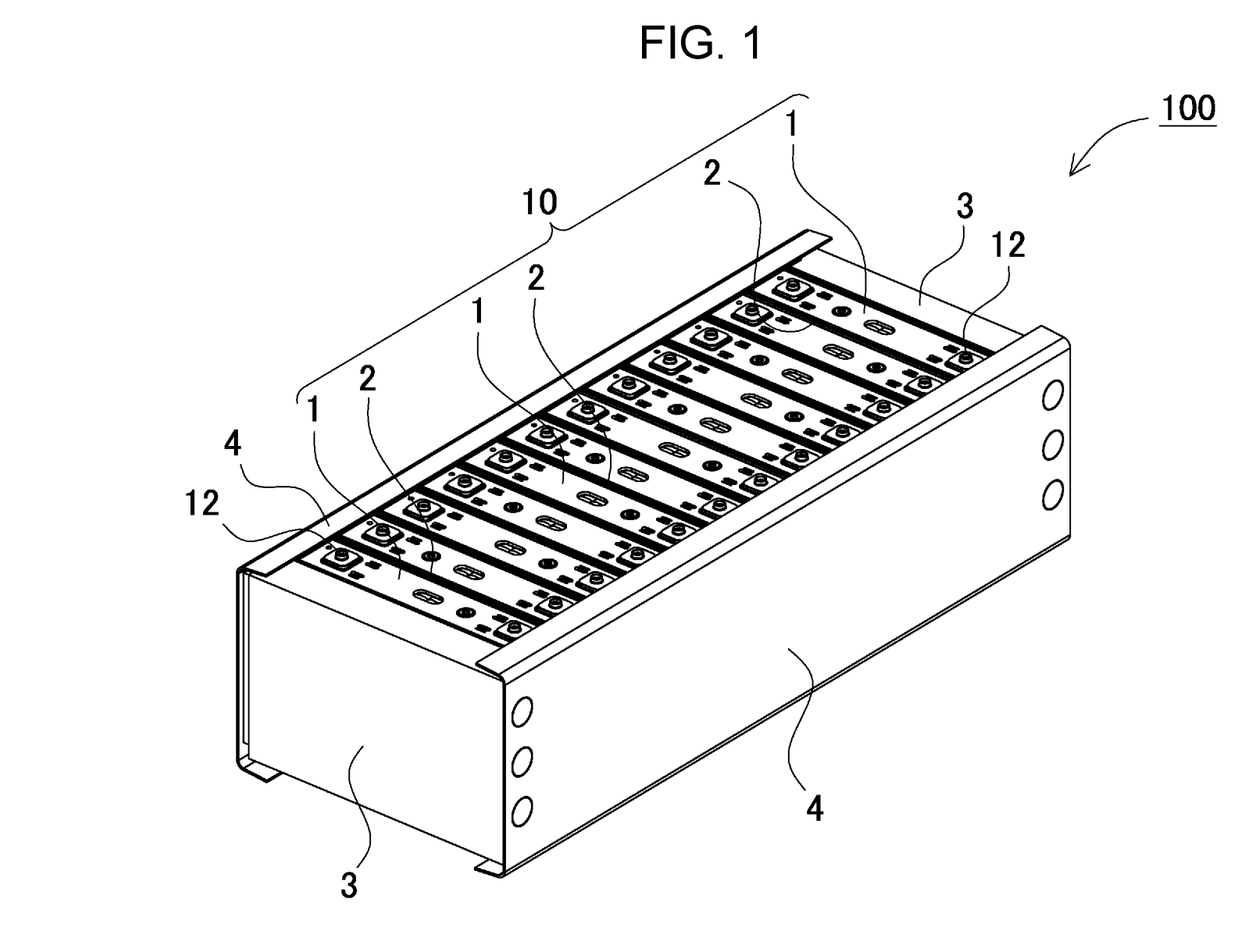
FIG. 1 is a perspective view of a power supply device according to an exemplary embodiment of the present invention.
Figure 2:
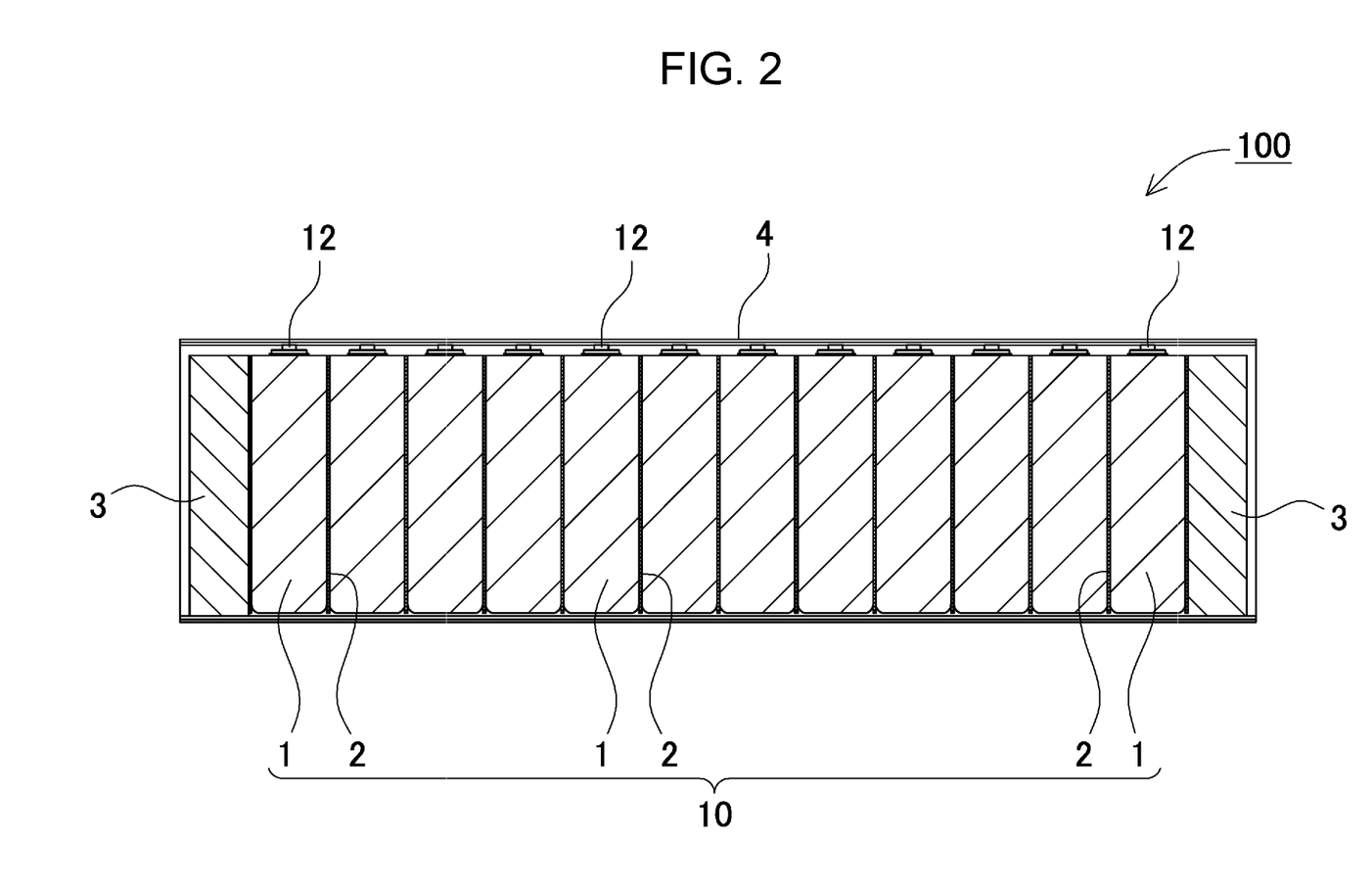
FIG. 2 is a vertical cross-sectional view of the power supply device shown in FIG. 1.
Figure 3:
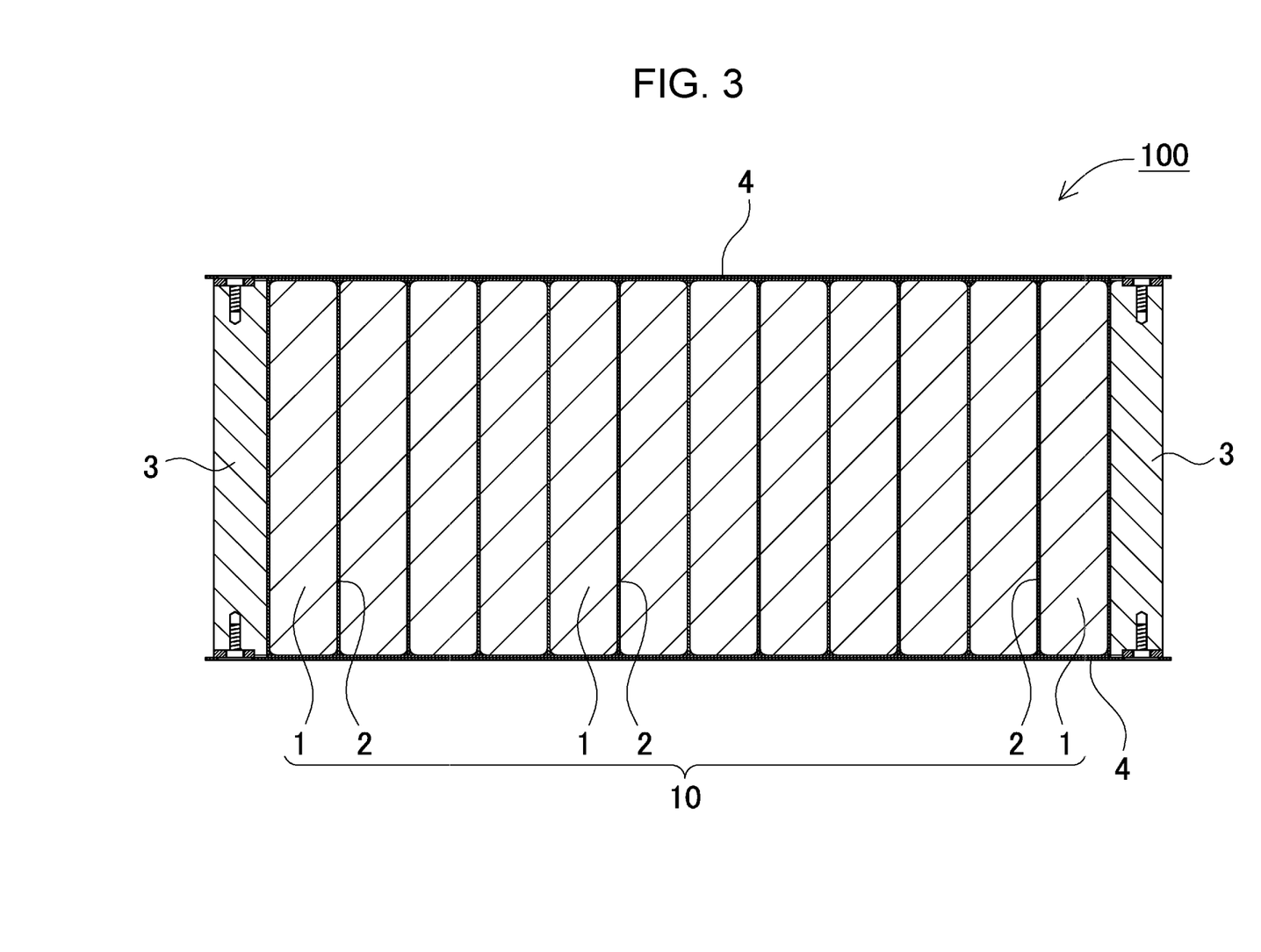
FIG. 3 is a horizontal cross-sectional view of the power supply device shown in FIG. 1.

Power supply device 100 illustrated in the perspective view of FIG. 1, the vertical cross-sectional view of FIG. 2, and the horizontal cross-sectional view of FIG. 3 includes battery block 10 in which a plurality of battery cells 1 are stacked in a thickness with separator 2 interposed therebetween, a pair of end plates 3 disposed on both end surfaces of battery block 10, and binding bar 4 that couples the pair of end plates 3 and fixes battery block 10 in a pressurized state via end plates 3.

(Battery Block 10)

Battery cell 1 of battery block 10 is a prismatic battery cell having a quadrangular outer shape, and a pair of positive and negative electrode terminals 12 that protrude upward are provided at both ends of the upper surface. A safety valve (not illustrated) is provided between electrode terminals 12. The safety valve opens to release internal gas when the internal pressure of battery cell 1 rises to a predetermined value or more. The safety valve prevents an increase in internal pressure of battery cell 1.

(Battery Cell 1)

Battery cell 1 is a lithium ion secondary battery. Power supply device 100 in which battery cell 1 is a lithium ion secondary battery has an advantage of an increased charge capacity with respect to the capacity and weight. However, battery cell 1 may be any other chargeable battery such as a non-aqueous electrolyte secondary battery other than the lithium ion secondary battery.

(End Plate 3, Binding Bar 4)

End plate 3 is a metal plate having an outer shape substantially equal to the outer shape of battery cell 1, which is not deformed by being pressed by battery block 10, and binding bar 4 is coupled to both side edges of end plate 3. Binding bar 4 couples, in a pressurized state, battery cells 1 on which end plates 3 are stacked, and fixes battery block 10 in the pressurized state at a predetermined pressure.

(Separator 2)

Separator 2 is sandwiched between stacked battery cells 1 to insulate adjacent battery cells 1, further interrupts heat conduction between the batteries, and further absorbs expansion of battery cells 1. Battery block 10 has a bus bar (not illustrated) fixed to electrode terminals 12 of adjacent battery cells 1 to connect battery cells 1 in series or in parallel. Battery cells 1 connected in series are insulated and stacked by separator 2 because a potential difference is generated between the battery cases. Battery cells 1 connected in parallel are insulated and stacked by separator 2 in order to prevent induction of thermal runaway although no potential difference is generated between the battery cases.

Figure 4:
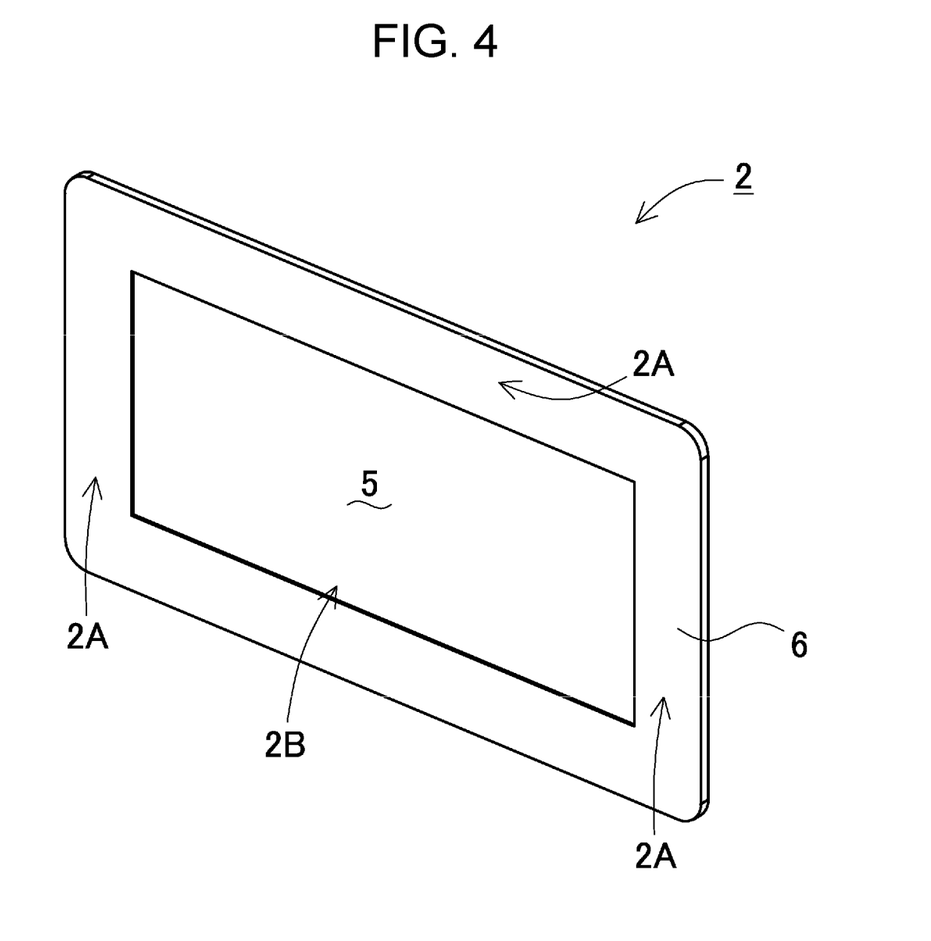
FIG. 4 is a perspective view of a separator.

As shown in FIG. 4, separator 2 has rubber-like elastic sheets 6 stacked on the surface of heat insulating sheet 5. Heat insulating sheet 5 is made of a fiber sheet and silica aerogel. In heat insulating sheet 5, gaps between fibers are filled with silica aerogel having extremely low thermal conductivity. Rubber-like elastic sheet 6 is a sheet that is pressed to be thinly elastically deformed. The thickness of rubber-like elastic sheet 6 is elastically changed by the pressure to absorb expansion and contraction of battery cell 1, thereby preventing deterioration of heat insulating sheet 5. Heat insulating sheet 5 made of silica aerogel is deteriorated in thermal insulating properties when the fragile silica aerogel is compressed and destroyed. Rubber-like elastic sheet 6 reduces the compressive stress of the silica aerogel at the time of expansion of battery cells 1 to prevent destruction, and ensures the excellent heat insulating properties of heat insulating sheet 5 over a long period of time to prevent thermal runaway of battery cell 1 and induction of thermal runaway.

(Heat Insulating Sheet 5)

Heat insulating sheet 5 includes a fiber sheet and silica aerogel having a nanosize porous structure. Heat insulating sheet 5 is manufactured by impregnating fibers with a gel raw material of silica aerogel. A fiber sheet is impregnated with silica aerogel, then fibers are stacked, a gel raw material is reacted to form a wet gel, and the wet gel surface is hydrophobized and dried with hot air. The fibers of the fiber sheet are made of polyethylene terephthalate (PET). However, as the fiber of the fiber sheet, inorganic fibers such as flame-retardant oxidized acrylic fibers and glass wool can also be used.

The fiber sheet of heat insulating sheet 5 preferably has a fiber diameter of 0.1 to 30 µm. The fiber diameter of the fiber sheet is made smaller than 30 µm to reduce heat conduction by the fibers, so that heat insulating properties of heat insulating sheet 5 can be improved. Silica aerogel is inorganic fine particles composed of 90% to 98% of air, and has fine pores between skeletons formed by clusters in which nano-order spherical bodies are bonded, and has a three-dimensional fine porous structure.

Heat insulating sheet 5 composed of a fiber sheet and silica aerogel is thin and exhibits excellent heat insulating properties. Heat insulating sheet 5 is set to have a thickness that is enough to be able to prevent induction of thermal runaway of battery cells 1 in consideration of energy of heat generated by thermal runaway of battery cells 1. The energy generated by the thermal runaway of battery cells 1 increases when the charge capacity of battery cells 1 increases. Accordingly, the thickness of heat insulating sheet 5 is set to an optimum value in consideration of the charge capacity of battery cells 1. For example, for a power supply device in which a lithium ion secondary battery having a charge capacity of 5 Ah to 20 Ah is used as battery cell 1, the thickness of heat insulating sheet 5 is set to 0.5 mm to 2 mm, optimally about 1 mm to 1.5 mm. However, the present invention does not specify the thickness of the elastic sheet within the above range, and the thickness of heat insulating sheet 5 is set to an optimum value in consideration of the heat insulating property of thermal runaway including the fiber sheet and the silica aerogel and the heat insulating property required for preventing induction of thermal runaway of battery cells 1.

(Rubber-Like Elastic Sheet 6)

As shown in FIG. 4, separator 2 has rubber-like elastic sheets 6 stacked on the surface of heat insulating sheet 5. Thick separator 2 is stacked between battery cells 1 to enlarge battery block 10. Since battery block 10 is required to be downsized, separator 2 is required to be as thin as possible to achieve heat insulating properties. This is because power supply device 100 is required to increase the charge capacity with respect to the volume. In power supply device 100, in order to downsize battery block 10 and increase the charge capacity, it is important for separator 2 to thin rubber-like elastic sheet 6 and heat insulating sheet 5 to prevent induction of thermal runaway of battery cells 1. For this reason, rubber-like elastic sheet 6 is, for example, from 0.2 mm to 2 mm inclusive, more preferably from 0.3 mm to 1 mm inclusive to suppress an increase in compressive stress due to expansion of battery cells 1. Furthermore, rubber-like elastic sheet 6 is preferably made thinner than heat insulating sheet 5, and reduces the compressive stress at the time of expansion of battery cells 1.

Rubber-like elastic sheet 6 is a non-foamed rubber-like elastic body or a closed-cell foam. In rubber-like elastic sheet 6, the rubber compressed in the stacked region is pushed out to the non-stacked region due to incompressibility in which the volume hardly changes by compression, and changes in shape and pressure are mitigated at the boundary part between the stacked region and the non-stacked region. As rubber-like elastic sheet 6, a synthetic rubber sheet is suitable. As the synthetic rubber sheet, any of isoprene rubber, styrene butadiene rubber, butadiene rubber, chloroprene rubber, nitrile rubber, polyisobutylene rubber, ethylene propylene rubber, ethylene vinyl acetate copolymer rubber, chlorosulfonated polyethylene rubber, acrylic rubber, fluororubber, epichlorohydrin rubber, urethane rubber, silicone rubber, thermoplastic olefin rubber, ethylene propylene diene rubber, butyl rubber, and polyether rubber can be used alone or in a stack of a plurality of synthetic rubber sheets. In particular, ethylene propylene rubber, ethylene vinyl acetate copolymer rubber, chlorosulfonated polyethylene rubber, acrylic rubber, fluororubber, and silicone rubber have excellent heat insulating properties, and thus it is possible to achieve higher safety by lengthening the time until thermal runaway and thermal melting. When rubber-like elastic sheet 6 is made of urethane rubber, it is particularly preferable to use thermoplastic polyurethane rubber or foamed polyurethane rubber. When rubber-like elastic sheet 6 is made of foamed urethane rubber, the physical properties of the foamed urethane rubber are preferably a density of 150 kg/ma to 750 kg/m$^3$, a thickness of 0.5 mm to 6.0 mm, and a compression set of 20% or less. The compression set mentioned here can be obtained by the following method. The foamed urethane rubber to be measured is compressed by 50% at an environmental temperature of 100° C. The compressed state is maintained for 22 hours. Thereafter, the compressed state is released, and the thickness of the foamed urethane rubber is measured. The compression set is obtained by comparing the thicknesses before and after the test.

As shown in FIGS. 4 and 5, in separator 2, rubber-like elastic sheets 6 are not stacked on the entire surface of heat insulating sheet 5. Separator 2 is partitioned into stacked region 2A and non-stacked region 2B. Rubber-like elastic sheets 6 are stacked only in stacked region 2A, and rubber-like elastic sheets 6 are not stacked in non-stacked region 2B. In power supply device 100 shown in FIGS. 1 to 3, battery cells 1 are prismatic battery cells, and in separator 2, as shown in FIG. 4, an outer peripheral portion of heat insulating sheet 5 is stacked region 2A, and a central portion of heat insulating sheet 5 is non-stacked region 2B. Separator 2 having this structure absorbs expansion of the central portion of prismatic battery cells 1 in non-stacked region 2B. Separator 2 can efficiently absorb the expansion of battery cells 1 with the central portion of the prismatic battery cell as non-stacked region 2B in a wide area. As illustrated in the enlarged cross-sectional view of FIG. 5, rubber-like elastic sheet 6 provided in stacked region 2A of the outer peripheral portion of the prismatic battery cell is pressurized and thinly compressed by expanded battery cell 1. Compressed rubber-like elastic sheet 6 is pushed out from stacked region 2A and moves to non-stacked region 2B due to incompressibility of rubber. Rubber-like elastic sheet 6 moved to non-stacked region 2B becomes thinner as it moves to the inside of non-stacked region 2B, and mitigates the pressure change at the boundary part between stacked region 2A and non-stacked region 2B. Rubber-like elastic sheet 6 that gradually becomes thinner by moving to non-stacked region 2B also mitigates the stepwise change in the shape of the surface of battery cell 1. The changes in the shape and pressure of the surface of battery cell 1 is mitigated at the boundary part between stacked region 2A and non-stacked region 2B to reduce a mechanical load of the electrode, prevent the electrode from being damaged by the mechanical load, and prevent thermal runaway of the battery to improve safety. In separator 2 shown in FIG. 5, rubber-like elastic sheets 6 stacked on both surfaces of heat insulating sheet 5 have the same shape, but they do not necessarily have the same shape, and may have different shapes depending on cell characteristics and reaction force characteristics.

Figure 6:
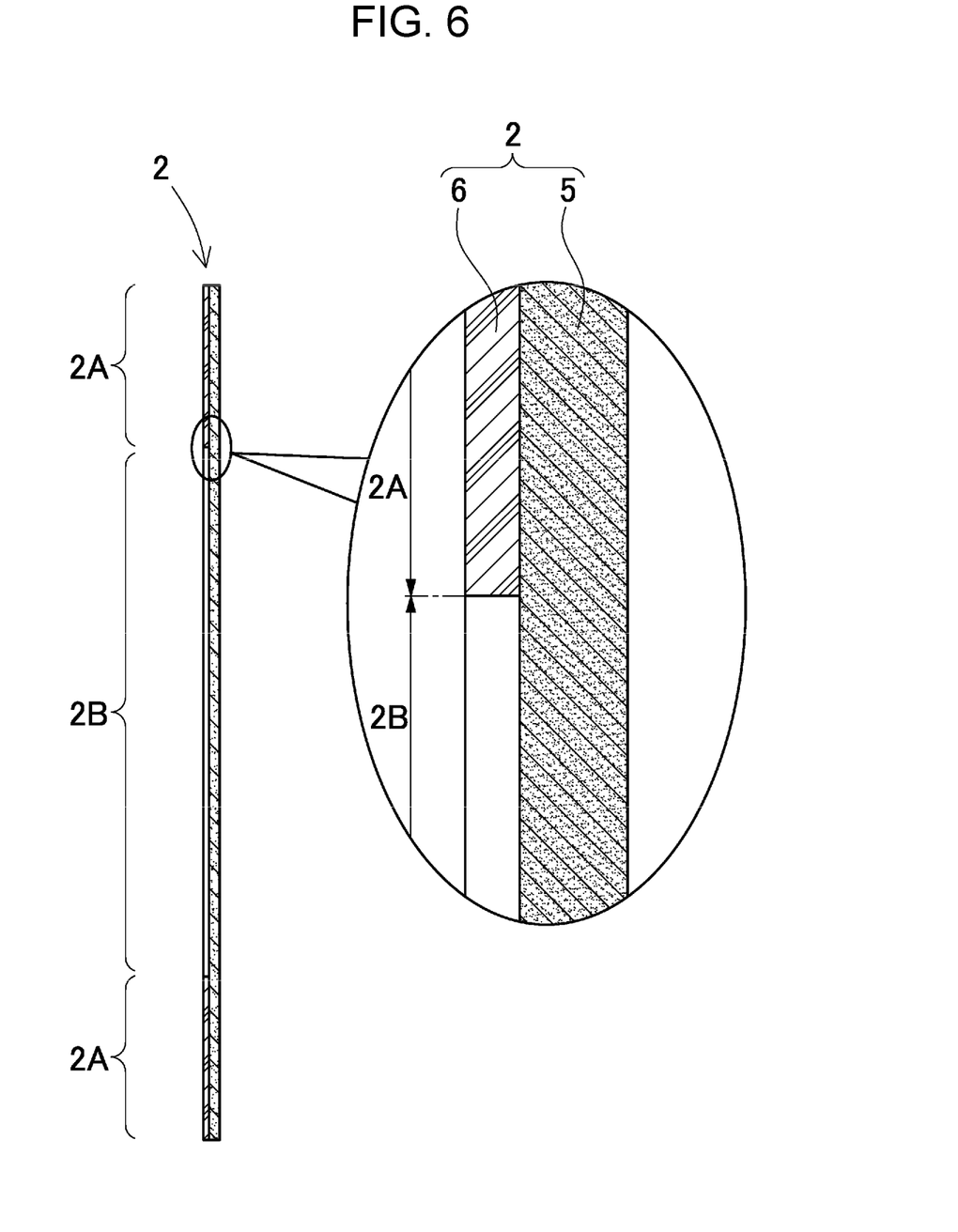
FIG. 6 is a partially enlarged cross-sectional view showing another example of the separator.

Power supply device 100 described above preferably has a structure in which each of all separators 2 have rubber-like elastic sheets 6 stacked on both surfaces of heat insulating sheet 5, but does not necessarily have a structure in which each of all separators 2 have rubber-like elastic sheets 6 stacked on both surfaces of heat insulating sheet 5. As shown in FIG. 6, in separator 2, it is possible to stack rubber-like elastic sheets 6 on one surface of heat insulating sheet 5. Furthermore, in the power supply device, all the separators do not need to have a stack structure of the heat insulating sheets and the rubber-like elastic sheets, and the separator having only the heat insulating sheet and the separator having a stack structure of the heat insulating sheets and the rubber-like elastic sheets can be provided in a mixed manner.

Rubber-like elastic sheet 6 and heat insulating sheet 5 are bonded to each other with an adhesive layer or a sticky layer interposed therebetween and stacked at a fixed position. Note that rubber-like elastic sheet 6 and heat insulating sheet 5 may be integrally molded by a method such as two-color molding, and are not necessarily bonded via an adhesive layer or a sticky layer. Separator 2 and battery cell 1 are also bonded to each other with an adhesive or a sticky layer interposed therebetween and disposed at a fixed position. Separator 2 can also be disposed at a fixed position of a battery holder (not illustrated) in which battery cells 1 are disposed at fixed positions in a fitting structure.

In power supply device 100 described above, battery cell 1 is a prismatic battery cell having a charge capacity of 6 Ah to 10 Ah, heat insulating sheet 5 of separator 2 is "NASBIS (registered trademark) manufactured by Panasonic Corporation" in which a thickness of a fiber sheet filled with silica aerogel is 1 mm, and rubber-like elastic sheets 6 stacked on both surfaces of heat insulating sheet 5 is urethane rubber sheets each having a thickness of 0.5 mm, so that specific battery cell 1 can be forcibly thermally runaway to prevent induction of thermal runaway to adjacent battery cells 1.

The power supply device described above can be used as a power supply for a vehicle that supplies electric power to a motor that causes an electric vehicle to travel. As an electric vehicle on which the power supply device is mounted, an electric vehicle such as a hybrid vehicle or a plug-in hybrid vehicle that travels by both an engine and a motor, or an electric vehicle that travels only by a motor can be used, and is used as a power supply for these vehicles. Note that, in order to obtain power for driving the vehicle, an example will be described in which a large number of the above-described power supply devices are connected in series or in parallel, and large-capacity, high-output power supply device 100 to which a necessary control circuit is further added is constructed.

(Power Supply Device for Hybrid Vehicle)

Figure 7:
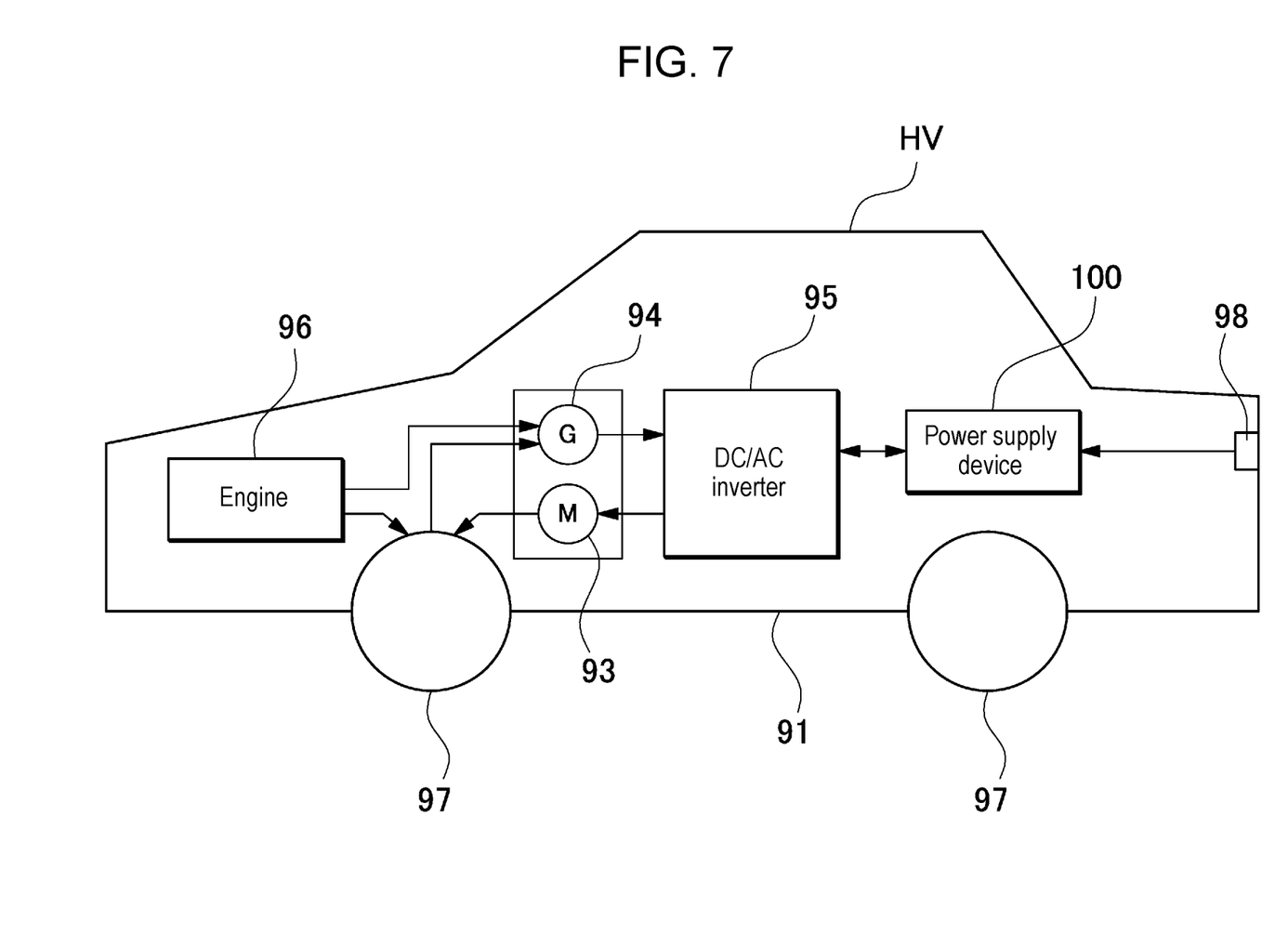
FIG. 7 is a block diagram showing an example in which the power supply device is mounted on a hybrid vehicle traveling by an engine and a motor.

FIG. 7 shows an example in which the power supply device is mounted on a hybrid vehicle that travels by both an engine and a motor. Vehicle HV on which the power supply device illustrated in this drawing is mounted includes vehicle body 91, engine 96 and traveling motor 93 that cause vehicle body 91 to travel, wheels 97 driven by engine 96 and traveling motor 93, power supply device 100 that supplies power to motor 93, and generator 94 that charges a battery of power supply device 100. Power supply device 100 is connected to motor 93 and generator 94 via DC/AC inverter 95. Vehicle HV travels by both motor 93 and engine 96 while charging and discharging the battery of power supply device 100. Motor 93 is driven to cause the vehicle to travel in an area with poor engine efficiency, for example, at the time of acceleration or low speed traveling. Motor 93 is driven by power supplied from power supply device 100. Generator 94 is driven by engine 96 or by regenerative braking when braking the vehicle to charge the battery of power supply device 100. As shown in FIG. 7, vehicle HV may include charging plug 98 for charging power supply device 100. Power supply device 100 can be charged by connecting charging plug 98 to an external power supply.

(Power Supply Device for Electric Vehicle)

Figure 8:
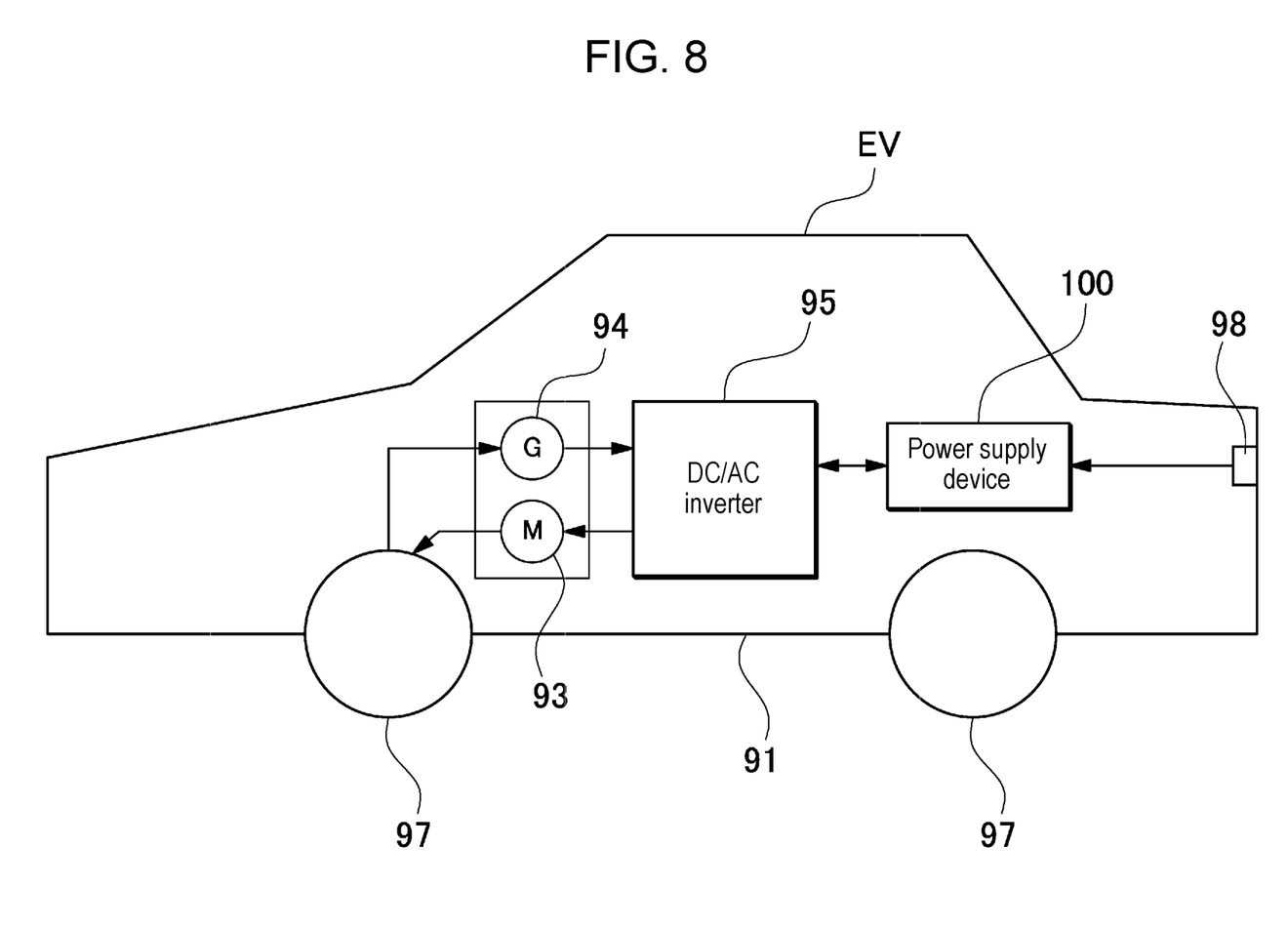
FIG. 8 is a block diagram showing an example in which the power supply device is mounted on an electric vehicle traveling only by a motor.

FIG. 8 shows an example in which the power supply device is mounted on an electric vehicle that travels only by a motor. Vehicle EV on which the power supply device illustrated in this drawing is mounted includes vehicle body 91, traveling motor 93 that causes vehicle body 91 to travel, wheels 97 driven by motor 93, power supply device 100 that supplies power to motor 93, and generator 94 that charges the battery of power supply device 100. Power supply device 100 is connected to motor 93 and generator 94 via DC/AC inverter 95. Motor 93 is driven by power supplied from power supply device 100. Generator 94 is driven by the energy at the time of regenerative braking of vehicle EV to charge the battery of power supply device 100. In addition, vehicle EV includes charging plug 98, and power supply device 100 can be charged by connecting charging plug 98 to an external power supply.

Furthermore, the present invention does not specify the application of the power supply device as the power supply for a motor that drives a vehicle. The power supply device according to the exemplary embodiments can also be used as a power supply for a power storage device that stores electricity by charging a battery with electric power generated by solar power generation, wind power generation, or the like.

Furthermore, the power supply device can also be used as a power supply for a power storage device that stores electricity by charging a battery using midnight electric power at night. The power supply device charged with the midnight power can be charged with the midnight electric power, which is surplus power of the power plant, outputs power in the daytime when the power load becomes large, and limit the peak power in the daytime to be small. Furthermore, the power supply device can also be used as a power supply that charges with both the output of a solar cell and the midnight electric power. This power supply device can efficiently store electricity in consideration of weather and power consumption by effectively using both power generated by the solar cell and midnight electric power.

The power storage device as described above can be suitably used for applications such as a backup power supply device that can be mounted on a rack of a computer server, a backup power supply device for a wireless base station such as a mobile phone, a power supply for household or factory power storage, a power supply device combined with a solar cell such as a power supply for street lamps, and a backup power supply for traffic lights and traffic indicators for roads.

INDUSTRIAL APPLICABILITY

The power supply device according to the present invention can be suitably used as a large-current power supply used for a power supply of a motor for driving an electric vehicle such as a hybrid vehicle, a fuel cell vehicle, an electric vehicle, or an electric motorcycle. Examples thereof include power supply devices such as plug-in hybrid electric vehicles, hybrid electric vehicles, and electric vehicles that can switching between an electric vehicle (EV) traveling mode and a hybrid electric vehicle (HEV) traveling mode. The present invention can be appropriately used for applications such as a backup power supply device that can be mounted on a rack of a computer server, a backup power supply device for a wireless base station such as a mobile phone, a power supply for household or factory power storage, a power storage device combined with a solar cell such as a power supply for street lamps, and a backup power supply for traffic lights and the like.

REFERENCE MARKS IN THE DRAWINGS

100: power supply device
1: battery cell
2: separator
2A: stacked region
2B: non-stacked region
3: end plate
4: binding bar
5: heat insulating sheet
6: rubber-like elastic sheet
10: battery block
12: electrode terminal
91: vehicle body
93: motor
94: generator
95: DC/AC inverter
96: engine 97: wheel
98: charging plug
HV, EV: vehicle

The invention claimed is:
1. A power supply device comprising:
a battery block including a plurality of battery cells stacked in a stacking direction along a thickness of each of the plurality of battery cells with a separator interposed between the plurality of battery cells;
a pair of end plates disposed on both end surfaces of the battery block; and
a binding bar coupled to the pair of end plates to fix the battery block in a pressurized state via the end plates, wherein
the separator comprises
a heat insulating sheet including a fiber sheet and silica aerogel, and
an elastic sheet stacked on a surface of the heat insulating sheet,
the separator defines
a stacked region in which the elastic sheet is stacked on the surface of the heat insulating sheet, and
a non-stacked region in which the elastic sheet is not stacked on the surface of the heat insulating sheet, the non-stacked region being thinner than the stacked region,
in a plan view of the separator, the stacked region is arranged on an outer peripheral portion of the heat insulating sheet, and the non-stacked region is arranged on a central portion, inward from the outer peripheral portion, of the heat insulating sheet, and
the elastic sheet is stacked, in the stacking direction, only on one of both major surfaces of the heat insulating sheet, the major surfaces facing adjacent battery cells of the plurality of battery cells in the stacking direction such that the elastic sheet interposed between the adjacent battery cells is compressible and extendable from the stacked region toward the non-stacked region in response to pressure of expanded battery cells of the plurality of battery cells.
2. The power supply device according to claim 1, wherein each of the plurality of battery cells is a prismatic battery cell.
3. The power supply device according to claim 1, wherein the elastic sheet of the separator is a non-foamed elastic body or a closed-cell foam.
4. The power supply device according to claim 1, wherein the elastic sheet contains a synthetic rubber.
5. The power supply device according to claim 4, wherein the synthetic rubber of the elastic sheet is any of isoprene rubber, styrene butadiene rubber, butadiene rubber, chloroprene rubber, nitrile rubber, polyisobutylene rubber, ethylene propylene rubber, ethylene vinyl acetate copolymer rubber, chlorosulfonated polyethylene rubber, acrylic rubber, fluororubber, epichlorohydrin rubber, urethane rubber, silicone rubber, thermoplastic olefin rubber, ethylene propylene diene rubber, butyl rubber, and polyether rubber.
6. The power supply device according to claim 1, wherein a thickness of the elastic sheet is from 0.2 mm to 2 mm inclusive.
7. The power supply device according to claim 6, wherein the heat insulating sheet is thicker than the elastic sheet.
8. The power supply device according to claim 1, wherein the heat insulating sheet has a thickness from 0.5 mm to 2 mm inclusive.
9. The power supply device according to claim 1, wherein the separator is stacked between each pair of adjacent battery cells among the plurality of battery cells.
10. An electric vehicle comprising:
the power supply device according to claim 1;
a motor for traveling supplied with electric power from the power source device;
a vehicle body mounted with the power supply device and the motor; and
a wheel driven by the motor to cause the vehicle body to travel.
11. A power supply device comprising:
a battery block including a plurality of battery cells stacked along a thickness of each of the plurality of battery cells with a separator interposed between the plurality of battery cells;
a pair of end plates disposed on both end surfaces of the battery block; and
a binding bar coupled to the pair of end plates to fix the battery block in a pressurized state via the end plates, wherein
the separator comprises
a heat insulating sheet including a fiber sheet and silica aerogel, and
an elastic sheet stacked on a surface of the heat insulating sheet,
the separator defines
a stacked region in which the elastic sheet is stacked on the surface of the heat insulating sheet, and
a non-stacked region in which the elastic sheet is not stacked on the surface of the heat insulating sheet, the non-stacked region being thinner than the stacked region,
in a plan view of the separator, the stacked region is arranged on an outer peripheral portion of the heat insulating sheet, and the non-stacked region is arranged on a central portion, inward from the outer peripheral portion, of the heat insulating sheet,
the elastic sheet contains a synthetic rubber being any of isoprene rubber, styrene butadiene rubber, butadiene rubber, chloroprene rubber, nitrile rubber, polyisobutylene rubber, ethylene propylene rubber, ethylene vinyl acetate copolymer rubber, chlorosulfonated polyethylene rubber, acrylic rubber, epichlorohydrin rubber, thermoplastic olefin rubber, ethylene propylene diene rubber, butyl rubber, and polyether rubber, and
the elastic sheet is stacked, in the stacking direction, only on one of both major surfaces of the heat insulating sheet, the major surfaces facing adjacent battery cells of the plurality of battery cells in the stacking direction such that the elastic sheet interposed between the adjacent battery cells is compressible and extendable from the stacked region toward the non-stacked region in response to pressure of expanded battery cells of the plurality of battery cells.
12. The power supply device according to claim 11, wherein
each of the plurality of battery cells is a prismatic battery cell.
13. The power supply device according to claim 11, wherein the elastic sheet is stacked on each of both major surfaces of the heat insulating sheet.
14. The power supply device according to claim 11, wherein the elastic sheet is stacked only on one of both major surfaces of the heat insulating sheet.

15. The power supply device according to claim 11, wherein the elastic sheet of the separator is a non-foamed elastic body or a closed-cell foam.

16. The power supply device according to claim 11, wherein a thickness of the elastic sheet is from 0.2 mm to 2 mm inclusive.

17. The power supply device according to claim 16, wherein the heat insulating sheet is thicker than the elastic sheet.

18. The power supply device according to claim 11, wherein the heat insulating sheet has a thickness from 0.5 mm to 2 mm inclusive.

19. The power supply device according to claim 11, wherein the separator is stacked between each pair of adjacent battery cells among the plurality of battery cells.

20. An electric vehicle comprising:
- the power supply device according to claim 11;
- a motor for traveling supplied with electric power from the power source device;
- a vehicle body mounted with the power supply device and the motor; and
- a wheel driven by the motor to cause the vehicle body to travel.

* * * * *